US011765612B2

(12) United States Patent
Venugopal et al.

(10) Patent No.: US 11,765,612 B2
(45) Date of Patent: Sep. 19, 2023

(54) SIGNALING FOR GROUP-BASED SIGNAL TO INTERFERENCE PLUS NOISE RATIO (SINR) BEAM REPORT

(71) Applicant: QUALCOMM Incorporated, San Diego, CA (US)

(72) Inventors: Kiran Venugopal, Raritan, NJ (US); Wooseok Nam, San Diego, CA (US); Yan Zhou, San Diego, CA (US); Junyi Li, Franklin Park, NJ (US); Qian Zhang, Basking Ridge, NJ (US); Tianyang Bai, Somerville, NJ (US); Jung Ho Ryu, Fort Lee, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 139 days.

(21) Appl. No.: 17/243,302

(22) Filed: Apr. 28, 2021

(65) Prior Publication Data
US 2021/0377766 A1   Dec. 2, 2021

Related U.S. Application Data

(60) Provisional application No. 63/032,489, filed on May 29, 2020.

(51) Int. Cl.
*H04W 24/10* (2009.01)
*H04W 24/08* (2009.01)
*H04L 5/00* (2006.01)

(52) U.S. Cl.
CPC ........... *H04W 24/10* (2013.01); *H04L 5/0048* (2013.01); *H04W 24/08* (2013.01)

(58) Field of Classification Search
CPC ... H04W 24/10; H04W 24/08; H04W 72/082; H04L 5/0048; H04L 5/0094; H04L 5/005;
(Continued)

(56) References Cited

U.S. PATENT DOCUMENTS

2015/0270917 A1* 9/2015 Roman ............... H04B 7/0417
370/329
2016/0050601 A1* 2/2016 Jeong ................ H04W 36/14
455/436
(Continued)

FOREIGN PATENT DOCUMENTS

WO   WO-2020091498 A1 * 5/2020
WO   WO-2020141951 A1 * 7/2020 ........... H04B 17/327
(Continued)

OTHER PUBLICATIONS

Jeffrey G. Andrews, "What Will 5G be?" IEEE, JSAC Special Issue On 5G Wireless Communication, 12, May 2014, CS.IT, Arxiv: 1405.2957v1 (Year: 2014).*

*Primary Examiner* — Ayaz R Sheikh
*Assistant Examiner* — Louis Samara
(74) *Attorney, Agent, or Firm* — Arun Swain

(57) ABSTRACT

A method of wireless communication receives multiple beams from a base station. The method also simultaneously reports a signal to interference plus noise ratio (SINR) for multiple beams with a single channel measurement resource (CMR) and a single interference measurement resource (IMR). The single IMR is configured for multiple interference sources. A method of wireless communication by a base station configures a UE with a group of interference sources. The base station also configures the UE with an interference measurement resource associated with the group of interference sources.

17 Claims, 8 Drawing Sheets

(58) Field of Classification Search
CPC ..... H04L 5/0051; H04B 7/0619; H04B 7/088; H04B 7/0417; H04B 17/327; H04B 7/0695
See application file for complete search history.

(56) References Cited

U.S. PATENT DOCUMENTS

| | | | |
|---|---|---|---|
| 2019/0215217 A1* | 7/2019 | Kim | H04W 72/0466 |
| 2019/0356364 A1* | 11/2019 | Maamari | H04L 5/0051 |
| 2020/0220631 A1* | 7/2020 | Onggosanusi | H04B 17/327 |
| 2021/0211176 A1 | 7/2021 | Gao et al. | |
| 2021/0352651 A1* | 11/2021 | Zhou | H04L 5/0048 |
| 2021/0377766 A1* | 12/2021 | Venugopal | H04B 7/0695 |
| 2021/0400677 A1* | 12/2021 | Lee | H04L 5/005 |
| 2022/0174712 A1* | 6/2022 | Zhang | H04L 5/0094 |
| 2022/0264318 A1* | 8/2022 | Nilsson | H04W 16/28 |
| 2022/0264348 A1* | 8/2022 | Manolakos | H04L 5/0073 |
| 2022/0345923 A1* | 10/2022 | Gao | H04B 7/0417 |

FOREIGN PATENT DOCUMENTS

| | | | | |
|---|---|---|---|---|
| WO | WO-2020207169 A1 * | 10/2020 | | G09G 3/2007 |
| WO | WO-2020207269 A1 * | 10/2020 | | H04W 24/02 |

* cited by examiner

SIGNALING FOR GROUP-BASED SIGNAL TO INTERFERENCE PLUS NOISE RATIO (SINR) BEAM REPORT

CROSS-REFERENCE TO RELATED APPLICATION

The present application claims the benefit of U.S. Provisional Patent Application No. 63/032,489, filed on May 29, 2020, and titled "SIGNALING FOR GROUP-BASED SIGNAL TO INTERFERENCE PLUS NOISE RATIO (SINR) BEAM REPORT," the disclosure of which is expressly incorporated by reference in its entirety.

FIELD OF THE DISCLOSURE

Aspects of the present disclosure generally relate to wireless communications, and more particularly to techniques and apparatuses for 5G new radio signaling for a group-based signal to interference plus noise ratio (SINR) beam report.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

According to aspects of the present disclosure, a method of wireless communication by a user equipment (UE) receives multiple beams from a base station. The method also simultaneously reports a signal to interference plus noise ratio (SINR) for the beams with a single channel measurement resource (CMR) and a single interference measurement resource (IMR). The single IMR is configured for multiple interference sources.

In other aspects, a method of wireless communication by a base station configures a UE with a group of interference sources. The method also includes configuring the UE with an interference measurement resource (IMR) associated with the group of interference sources.

In other aspects of the present disclosure, an apparatus for wireless communications at a user equipment (UE) includes one or more processors and memory coupled with the processor(s). Instructions stored in the memory are operable, when executed by the processor, to cause the apparatus to receive multiple beams from a base station. The apparatus can also simultaneously report a signal to interference plus noise ratio (SINR) for the beams with a single channel measurement resource (CMR) and a single interference measurement resource (IMR). The single IMR is configured for multiple interference sources.

In other aspects of the present disclosure, an apparatus for wireless communications at a base station includes a processor and memory coupled with the processor. Instructions stored in the memory are operable, when executed by the processor, to cause the apparatus to configure a UE with a group of interference sources. The instructions are also operable to cause the apparatus to configure the UE with an interference measurement resource (IMR) associated with the group of interference sources.

In other aspects of the present disclosure, a user equipment (UE) for wireless communications includes means for receiving multiple beams from a base station. The UE also includes means for simultaneously reporting a signal to interference plus noise ratio (SINR) for the beams with a single channel measurement resource (CMR) and a single interference measurement resource (IMR). The single IMR is configured for multiple interference sources.

In other aspects of the present disclosure, a base station for wireless communications includes means for configuring a UE with a group of interference sources. The base station also includes means for configuring the UE with an interference measurement resource (IMR) associated with the group of interference sources.

In other aspects of the present disclosure, a non-transitory computer-readable medium with program code recorded thereon is disclosed. The program code is executed by a user equipment (UE) and includes program code to receive multiple beams from a base station. The UE also includes program code to simultaneously report a signal to interference plus noise ratio (SINR) for the beams with a single channel measurement resource (CMR) and a single interference measurement resource (IMR). The single IMR is configured for multiple interference sources.

In other aspects of the present disclosure, a non-transitory computer-readable medium with program code recorded thereon is disclosed. The program code is executed by a base station and includes program code to configure a UE with a group of interference sources. The program code also includes program code to configure a UE with an interference measurement resource (IMR) associated with the group of interference sources.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
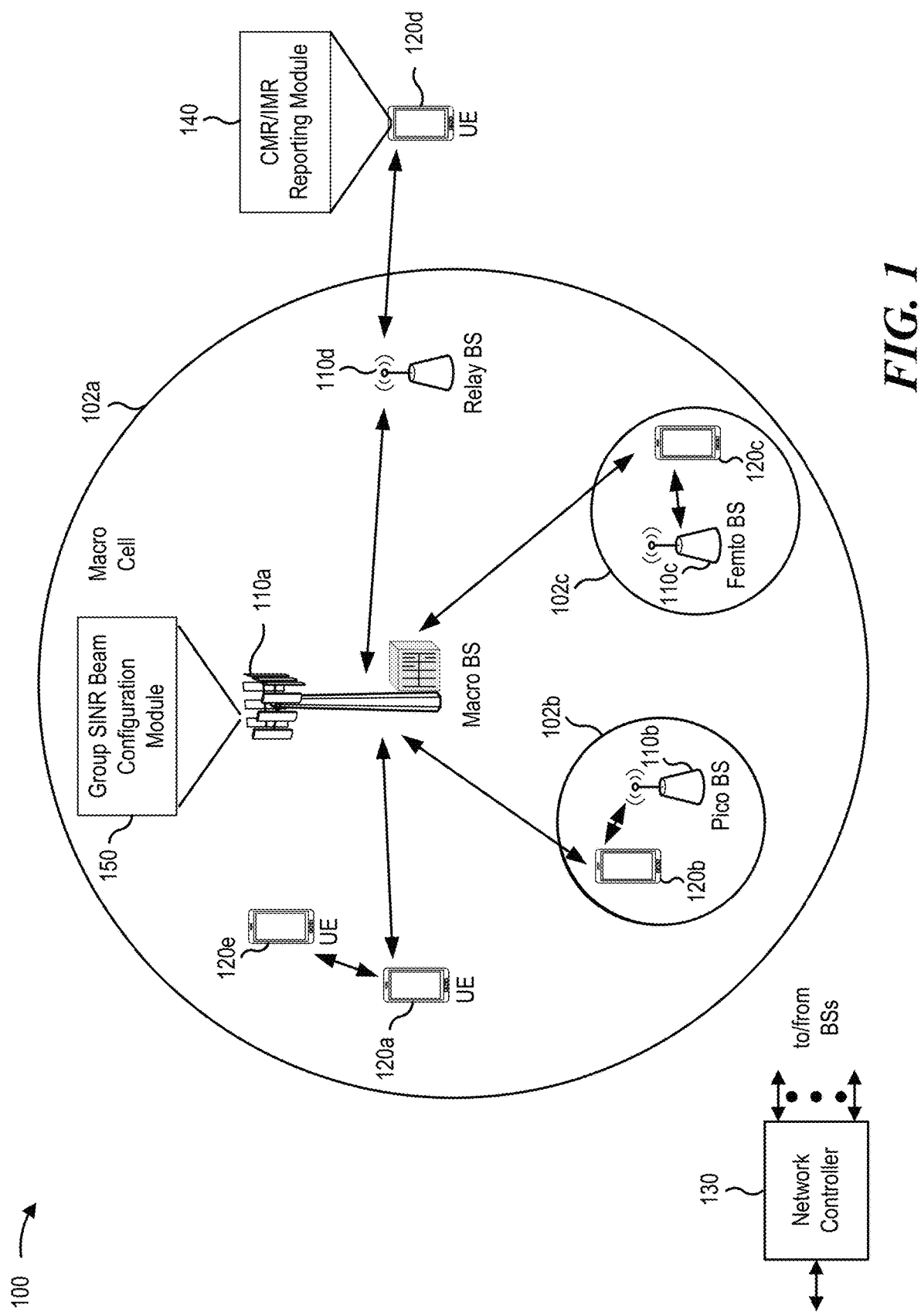
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Signal to interference plus noise ratio (SINR) based beam management has been accepted in the 3rd Generation Partnership Project (3GPP) standard. According to the standard, a base station may configure a UE with group-based beam reporting. In this configuration, the UE can report two different channel state information reference signal (CSI-RS) resource indicators (CRIs) and/or synchronization signal block resource indicators (SSBRIs) for each report setting. The QCL (quasi-colocation) parameters associated with channel state information reference signal (CSI-RS) or synchronization signal block (SSB) resources can be received simultaneously by the UE either with a single beam or with multiple simultaneous beams. Based on the report, the base station may configure joint beam transmission in the data channel for the UE, which improves transmission quality.

Currently, the base station decides which resources the UE should measure and maps the channel measurement resource (CMR) and interference measurement resource (IMR) accordingly. CMRs are a set of resource elements allocated for measuring a channel, and IMRs are a set of resource elements allocated for a UE to measure interference. Depending on how the CMR and IMR are mapped in the resource settings, the UE may compute and report the corresponding signal to interference plus noise ratio (SINR). However, when the candidate group size is greater than two (for example, when more than two simultaneously receivable beams are to be reported), then the mapping between CMR and IMR may need to be one-to-many and/or repetition may be enabled. These options specify additional resources and signaling, and/or increase measurement overhead.

According to aspects of the present disclosure, when a UE simultaneously reports SINR for more than two beams, a single IMR resource may include multiple interference sources. In this aspect, the IMR consists of multiple beams. This aspect saves repetition overhead and allows the UE to post-process and obtain the relevant SINR quantities associated with various candidate beam groups.

In other aspects, an existing group size is only two, for example, when SINR reports of two beams are requested. In this aspect, due to the multiplexing of the interfering sources, the UE may report the best combination of CMR-IMR with a single report setting, rather than specifying multiple one-to-one mapped report configurations.

In aspects of the present disclosure, a CSI-RS for interference measurement for beams from different transmit and receive points (TRPs) (interference sources) are code division multiplexed and/or frequency division multiplexed on a same symbol. In other aspects, the CSI-RSs for both interference sources occupy a same resource element (RE). In these aspects, the UE may separately measure the interference from each source based on scrambling sequences for each non-zero power (NZP) CSI-RS.

According to further aspects of the present disclosure, the base station may configure the UE with grouping information for the sources constituting the IMR. The configuration may be explicitly or implicitly signaled. According to other aspects of the present disclosure, the base station may explicitly or implicitly signal resources and/or a scrambling sequence for the respective CSI-RS from the interference sources in the resource setting. According to still other aspects of the present disclosure, the base station may explicitly or implicitly signal to indicate a candidate group size (for example, number of interfering beams) for the report configuration.

According to further aspects of the present disclosure, along with the SINR, the UE may also report an indication of which interference sources were used for SINR computation. According to other aspects of the present disclosure, the UE may indicate a strongest and weakest source of interference. For example, an order of the interference sources may be listed from strongest interferer to weakest interferer, or vice versa.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110.

As indicated above, FIG. 1 is provided merely as an example. Other examples may differ from what is described with regard to FIG. 1.

Figure 2:
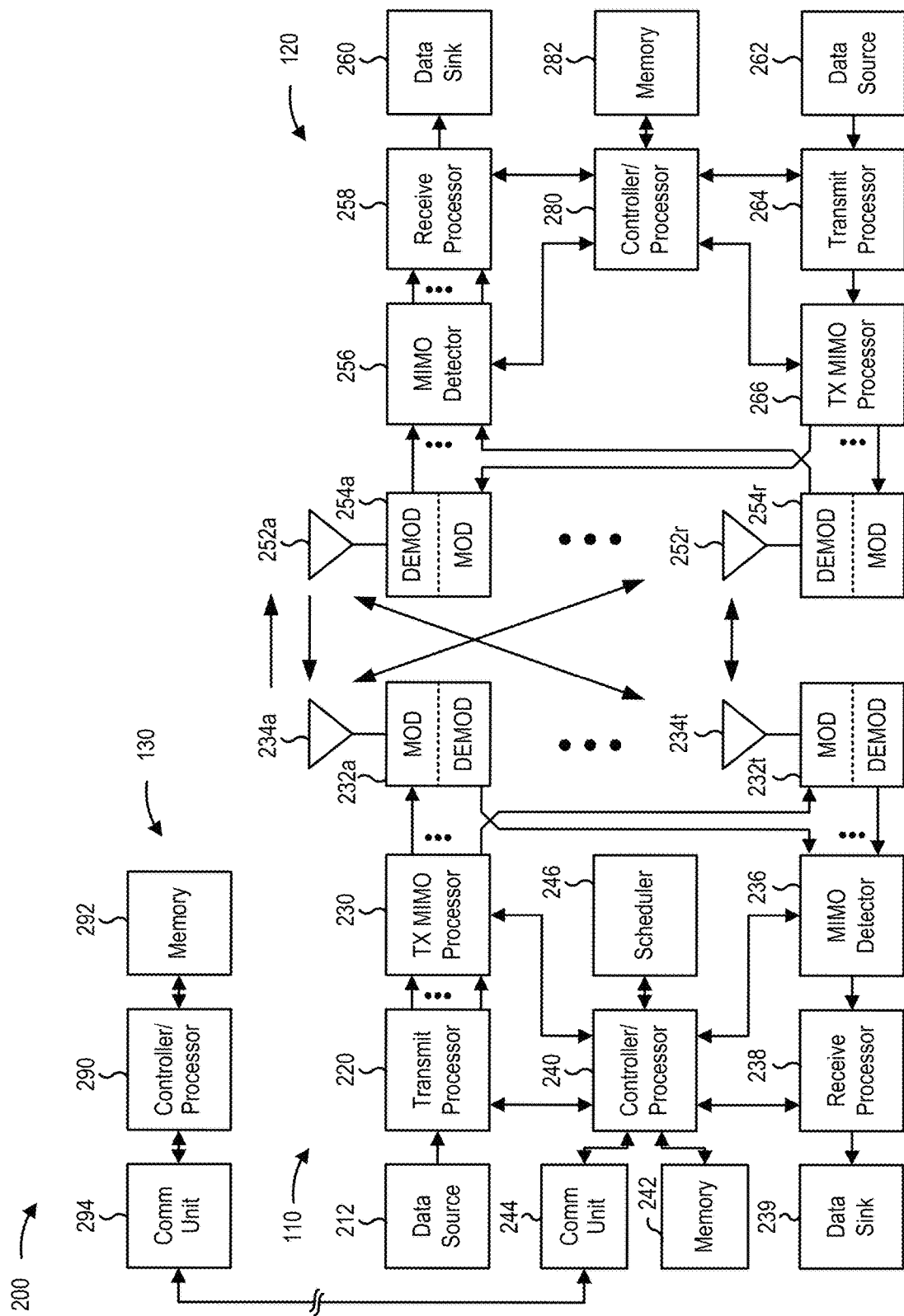
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with group-based SINR beam reporting, as described in more detail elsewhere. For example, the controller/processor 240 of the base station 110, the controller/processor 280 of the UE 120, and/or any other component(s) of FIG. 2 may perform or direct operations of, for example, the processes of FIGS. 7-8 and/or other processes as described. Memories 242 and 282 may store data and program codes for the base station 110 and UE 120, respectively. A scheduler 246 may schedule UEs for data transmission on the downlink and/or uplink.

The UEs 120 may include a CMR/IMR reporting module 140. For brevity, only one UE 120d is shown as including the CMR/IMR reporting module 140. The CMR/IMR reporting module 140 may receive multiple beams from a base station; and simultaneously report a signal to interference plus noise ratio (SINR) for the beams with a single channel measurement resource (CMR) and a single interference measurement resource (IMR). The single IMR is configured for multiple interference sources.

The base stations 110 may include a group SINR beam configuration module 150. For brevity, only one base station 110a is shown as including the group SINR beam configuration module 150. The group SINR beam configuration module 150 may configure a user equipment (UE) with a group of interference sources; and configure the UE with an interference measurement resource associated with the group of interference sources.

In some aspects, the UE 120 or base station 110 may include means for receiving, means for reporting, means for measuring, means for indicating, means for listing, means for configuring, and/or means for signaling. Such means may include one or more components of the UE 120 or base station 110 described in connection with FIG. 2.

As indicated above, FIG. 2 is provided merely as an example. Other examples may differ from what is described with regard to FIG. 2.

As described above, signal to interference plus noise ratio (SINR) based beam management has been accepted in the 3rd Generation Partnership Project (3GPP) standard. According to the standard, a base station may configure a UE with group-based beam reporting. In this configuration, the UE can report two different CSI-RS resource indicators (CRIs) and/or synchronization signal block resource indicators (SSBRIs) for each report setting. The QCL (quasi-colocation) parameters associated with channel state information reference signal (CSI-RS) or synchronization signal block (SSB) resources can be received simultaneously by the UE either with a single beam (for example, spatial domain receive filter) or with multiple simultaneous beams. Measurement and grouping are intended for simultaneous transmission and receiving with joint quasi co-location (QCL) in the data channel. Based on the report, the base station may configure joint beam transmission in the data channel for the UE, which improves transmission.

The UE may be configured to report either a layer 1 signal to interference plus noise ratio (L1-SINR) or layer 1 reference signal receive power (L1-RSRP) based reportQuantity under the current group-based beam reporting framework. A largest SINR (or RSRP) and associated CRI or SSBRI are fed back by the UE along with a differential SINR (or RSRP) relative to the largest quantity. The UE also feeds back the corresponding CRI or SSBRI.

Figure 3:
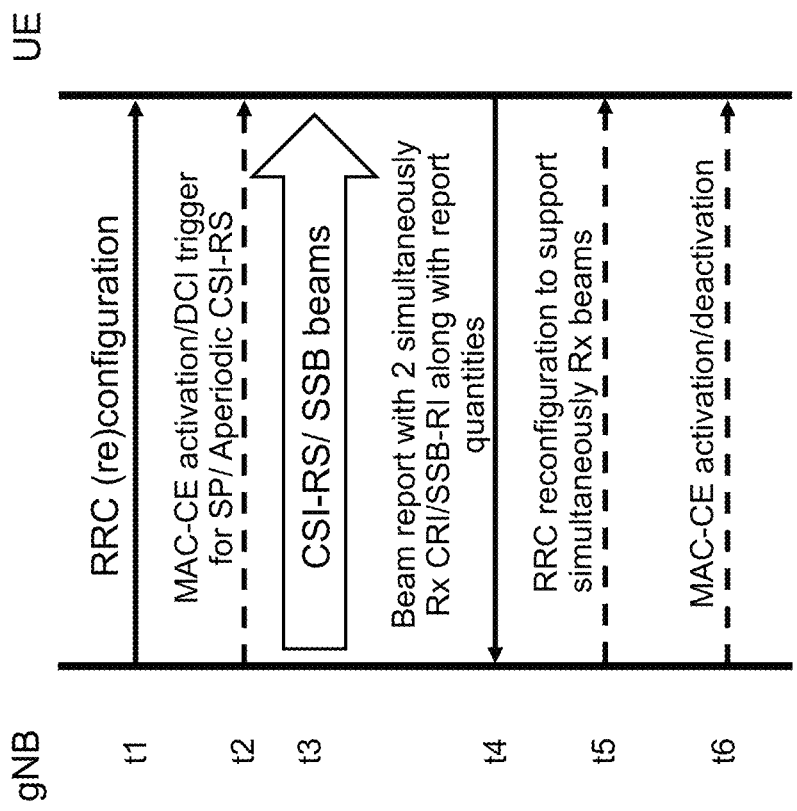
FIG. 3 is a timing diagram illustrating signal to interference plus noise ratio (SINR) beam management.

FIG. 3 is a timing diagram illustrating signal to interference plus noise ratio (SINR) beam management. At time t1, a base station (for example, gNB) configures a report setting, measurement setting, etc., with radio resource control (RRC) signaling. The report configuration is for a channel measurement and one of two types of interference measurement. The report configuration also indicates what quantity is requested (for example, SINR or RSRP) and resources for reporting. The measurement/reporting trigger/activation/deactivation may be optionally signaled via a medium access control-control element (MAC-CE) or downlink control information (DCI) at time t2. At time t3, the base station transmits CSI-RS or SSB beams to the UE. In accordance with the configuration, at time t4, the UE reports back to the base station with a beam report for two simultaneous CSI-RS or SSB beams. At time t5, the base station optionally reconfigures joint beam transmission, and at time t6, the base station optionally activates or deactivates the joint beam configuration. It is noted that the sequence shown in FIG. 3 is exemplary. Other chronologies are also contemplated.

When L1-SINR is reported, currently, either one or two resource settings may be configured. If only one resource setting is configured, the resource for channel measurement (CM) is used for both channel measurement and interference measurement (IM) to compute the L1-SINR. If two resource settings are configured, one resource is a channel measurement resource (CMR), and the second resource is an interference measurement resource (IMR). In this case, a one-to-one mapping exists between the IMR and CMR.

In both cases, the UE may apply a spatial filter quasi-location (for example, QCL-TypeD) assumption of the synchronization signal block (SSB) or non-zero power (NZP) CSI-RS resource for channel measurement to measure the associated channel state information-interference measurement (CSI-IM) resource or associated NZP CSI-RS resource for interference measurement configured for one CSI reporting.

Figure 4:
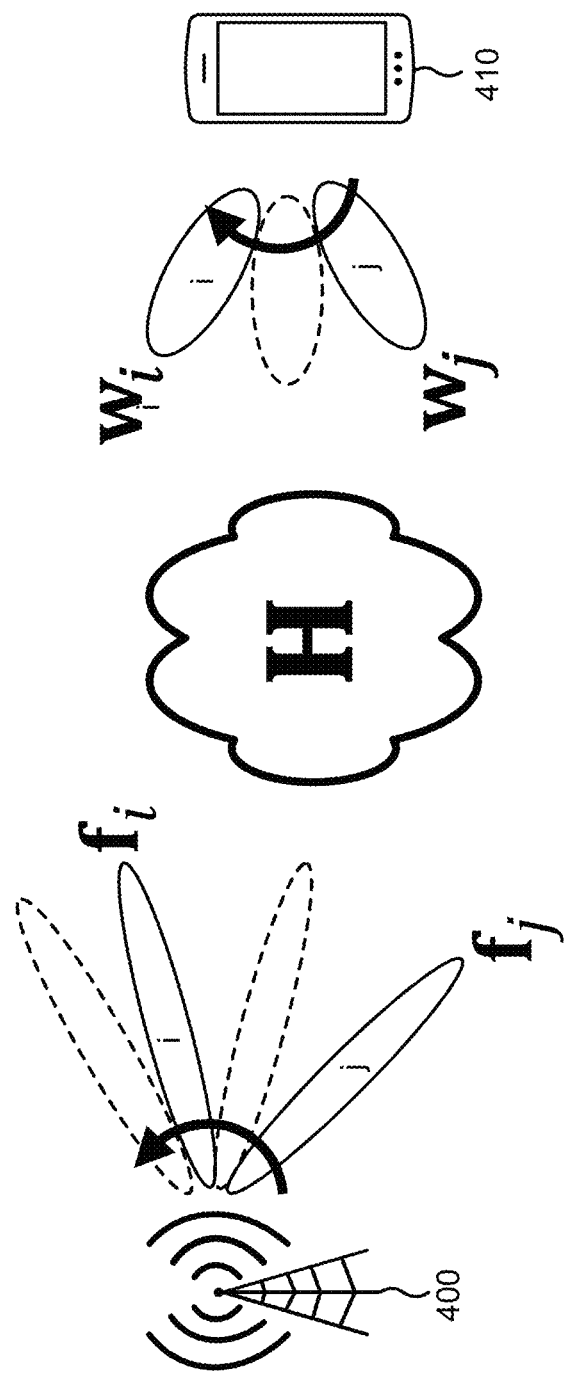
FIG. 4 is a block diagram illustrating a multiple transmit and receive point (mTRP) beam transmission configuration with a group size of two.

FIG. 4 is a block diagram illustrating a multiple transmit and receive point (mTRP) beam transmission configuration with a group size of two. That is, multiple beams are transmitted and the UE reports back on the two best beams. In FIG. 4, a base station 400 transmits multiple beams, with two beams i, j reported by a UE 410. The first beam i is the intended channel and has transmitter beam weights $f_i$, and the second beam j is the interfering beam and has transmitter beam weights $f_j$. After passing through a channel H, the UE 410 estimates receiver beam weights $W_i$ and $W_j$ for the first and second beams i, j, respectively. The UE 410 reports back the best two candidate beams, i, j, based on the SINR measurements, in accordance with the RRC configuration.

Currently, a base station decides which resources a UE should measure and maps the CMR and IMR accordingly. Depending on how the CMR and IMR are mapped in the resource settings, the UE may compute and report the corresponding L1-SINR. However, repetition and/or multiple signaling may be needed to enable measurement with different receive beams when more than two interference sources are to be measured. Repetition may also be needed to find the best pair when more than two interference sources are to be measured. Alternatively, multiple configurations may be signaled to achieve the one-to-one mapping between CMR and IMR while still evaluating more than three beams simultaneously (one intended channel and more than one interference source). To summarize, when the candidate group size is greater than two (for example, when more than two simultaneously receivable beams are to be reported), then the mapping between CMR and IMR may be one-to-many and/or repetition is enabled. These options specify additional resources and signaling, and/or increase measurement overhead.

According to aspects of the present disclosure, when a UE simultaneously reports SINR for more than two beams, a single IMR resource may include multiple interference sources. In these aspects, the IMR corresponds to multiple beams. These aspects allow the reporting to be treated as a one-to-one mapping between the CMR and the IMR, saving repetition overhead and allowing the UE to post-process and obtain the relevant SINR quantities associated with various candidate beam groups.

In other aspects, an existing group size is only two, for example, when SINR reports of two beams are requested. In these aspects, due to the multiplexing of the interfering sources, the UE may report the best combination of CMR-IMR with a single report setting, rather than specifying multiple one-to-one mapped report configurations.

Figure 5:
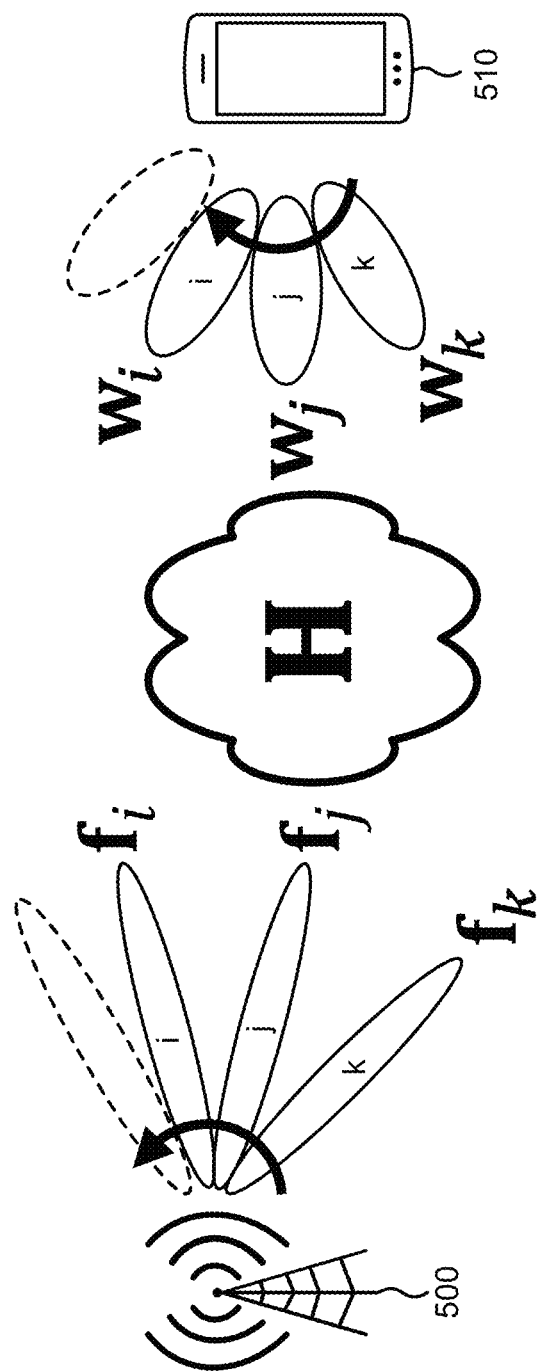
FIG. 5 is a block diagram illustrating a multiple transmit and receive point (mTRP) beam transmission configuration with a group size of three, in accordance with aspects of the present disclosure.

FIG. 5 is a block diagram illustrating a multiple transmit and receive point (mTRP) beam transmission configuration with a group size of three, in accordance with aspects of the present disclosure. In FIG. 5, a base station 500 (having multiple TRPs or remote radio heads (not shown)) transmits multiple beams with three beams, i, j, k to be reported by a UE 510 via a propagation channel H. The first beam i and the third beam k are interference sources in this example. The second beam j is the intended channel. The transmitter beam weights are depicted as $f_i$, $f_j$, $f_k$, and the receiver beam weights are depicted as $W_i$, $W_j$, $W_k$.

In aspects of the present disclosure, a CSI-RS for interference measurement for the beam i from a first TRP (interference source 1) and for the beam k from a second TRP (interference source 2) are code division multiplexed and/or frequency division multiplexed on a same symbol. In another aspect, the CSI-RSs for both interference sources occupy a same resource element (RE). In these aspects, the UE may separately measure the interference from each source by knowing scrambling sequences for each NZP CSI-RS.

According to a further aspect of the present disclosure, the base station may configure the UE with grouping information for the sources associated with the IMR. The configuration may be explicit signaling via radio resource control (RRC) signaling, a medium access control-control element (MAC-CE), or downlink control information (DCI) signaling. In other aspects, the base station implicitly configures the grouping information to the UE based on a resource ID of each of the resources from the multiple sources. For example, a mapping rule may be predefined.

According to other aspects of the present disclosure, the base station may explicitly signal resources and/or a scrambling sequence for the respective CSI-RS from the interference sources in the resource setting. The explicit signaling may be via radio resource control (RRC) signaling, a medium access control-control element (MAC-CE), or downlink control information (DCI) signaling. Alternatively, the base station may implicitly convey the information as a function of a cell ID, resource ID, bandwidth part (BWP), etc., of that resource.

According to still other aspects of the present disclosure, the base station may explicitly signal to indicate a candidate group size (for example, number of interfering beams) for the report configuration. The explicit signaling may be via a radio resource control (RRC) information element. Alternatively, the base station may implicitly provide the information based on the grouping information.

The base station should know which sources were accounted for in the UE report. According to aspects of the present disclosure, along with the CSI resource indicator-signal to interference plus noise ratio (CRI-SINR) or synchronization signal block resource indicator-signal to interference plus noise ratio (SSBRI-SINR), the UE may report an indication of which interference sources were used for SINR computation. For example, the UE may report a resource ID of the interference source. In another example, the UE transmits a bitmap indicating the interfering beam. In this example, the bitmap may include a sequence with ones and zeroes where a one corresponds to the interference sources used in the SINR computation among the set of interfering sources configured by the base station as the IMR resource. A zero would indicate sources not part of the computation.

According to other aspects of the present disclosure, the UE may indicate a strongest and a weakest source of interference. For example, an order of the interference sources may be listed from strongest interferer to weakest interferer, or vice versa. Each interferer may be indicated by its resource ID, in some aspects.

Figure 6:
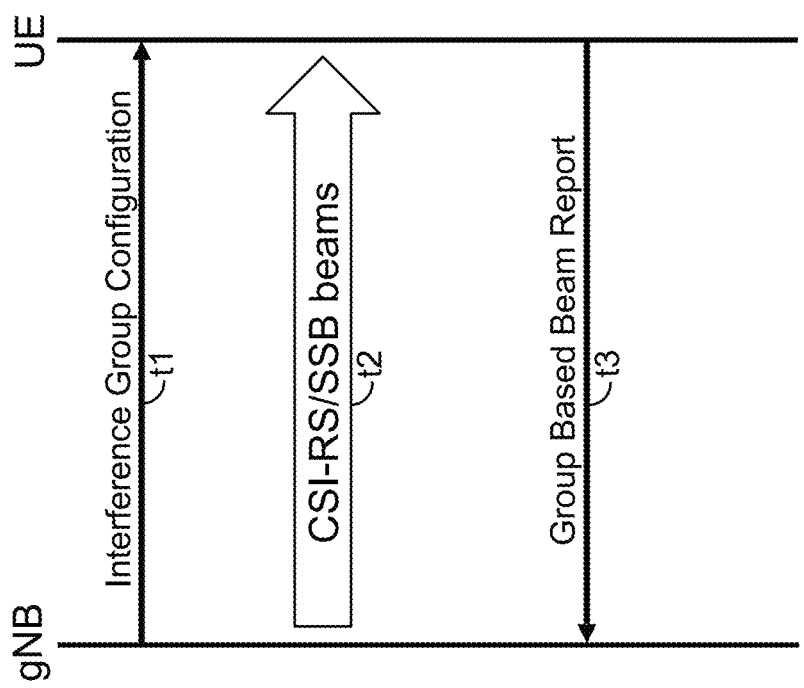
FIG. 6 is a timing diagram illustrating signaling for a group-based signal to interference plus noise ratio (SINR) beam report, in accordance with aspects of the present disclosure.

FIG. 6 is a timing diagram illustrating signaling for a group-based signal to interference plus noise ratio (SINR) beam report, in accordance with aspects of the present disclosure. At time t1, a base station (gNB) transmits an interference group configuration to a UE. For example, the base station may configure the UE with the grouping information of the sources corresponding to the IMR. At time t2, the base station transmits CSI-RS beams or SSB beams. In this example, the base station transmits three total beams, including two interfering beams. After measuring the beams, at time t3, the UE transmits a group-based beam report. That is, the UE simultaneously reports SINR for two interfering beams with a single IMR resource for multiple interference sources. The UE also reports the channel with a CMR. This process saves repetition overhead. Instead of reporting each interference source individually, multiple interference sources are reported with a single resource. The UE performs post-processing and then obtains relevant SINR quantities associated with various candidate beam groups.

As indicated above, FIGS. 3-6 are provided as examples. Other examples may differ from what is described with respect to FIGS. 3-6.

Figure 7:
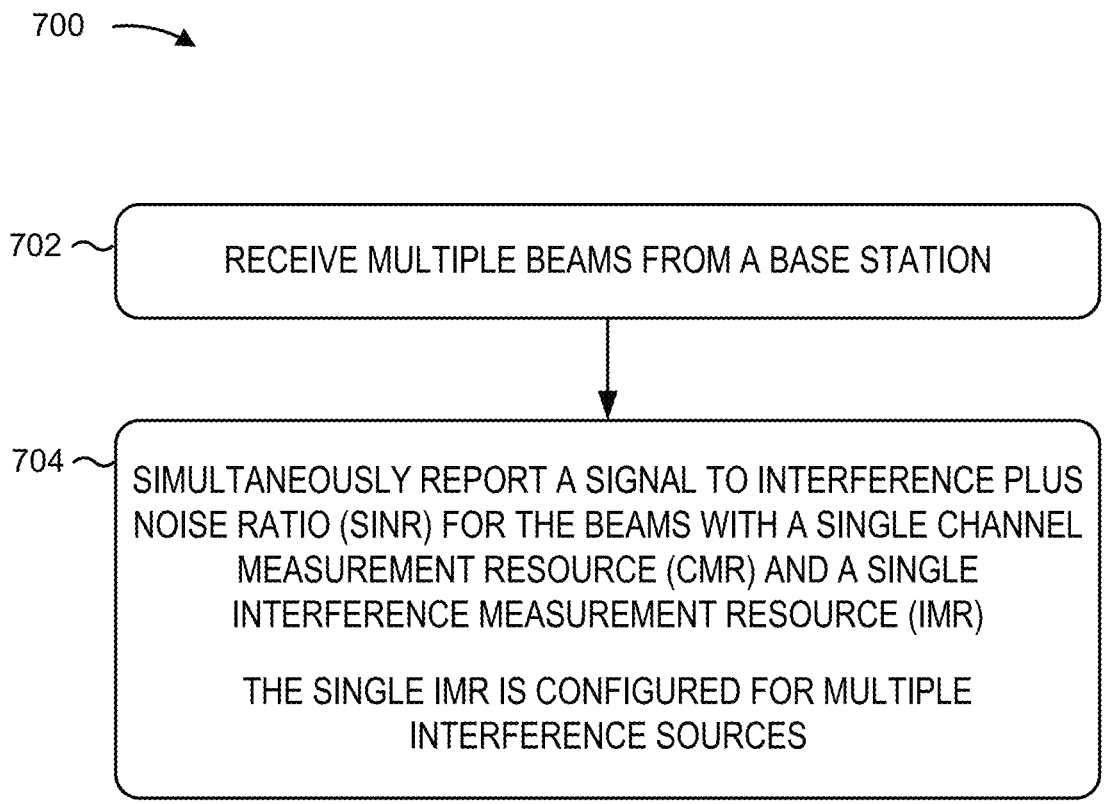
FIG. 7 is a flow diagram illustrating an example process performed, for example, by a user equipment (UE), in accordance with various aspects of the present disclosure.

FIG. 7 is a flow diagram illustrating an example process 700 performed, for example, by a user equipment (UE), in accordance with various aspects of the present disclosure. The example process 700 is an example of signaling for a group-based signal to interference plus noise ratio (SINR) beam report. As shown in FIG. 7, in some aspects, the process 700 may include receiving multiple beams from a base station (block 702). For example, the UE (for example, using the antenna 252a, DEMOD/MOD 254a, MIMO detector 256, receive processor 258, controller processor 280, and/or memory 282) may receive multiple beams. As seen in FIG. 5, for example, the UE 510 receives three beams, i, j, k. The beams may include an intended beam and two interfering beams, for example.

As shown in FIG. 7, in some aspects, the process 700 may include simultaneously reporting a SINR for the beams with a single channel measurement resource (CMR) and a single interference measurement resource (IMR). The single IMR is configured for multiple interference sources (block 704). For example, the UE (for example, using the antenna 252r, DEMOD/MOD 254r, TX MIMO processor 266, transmit processor 264, controller processor 280, and/or memory 282) may report a SINR. The SINR for multiple interference sources may be code division multiplexed and/or frequency division multiplexed on a same symbol. In other examples, the UE may separately measure interference from each of the interference sources on a same resource element based on a scrambling code for each zero power (NZP) channel state information reference signal.

Figure 8:
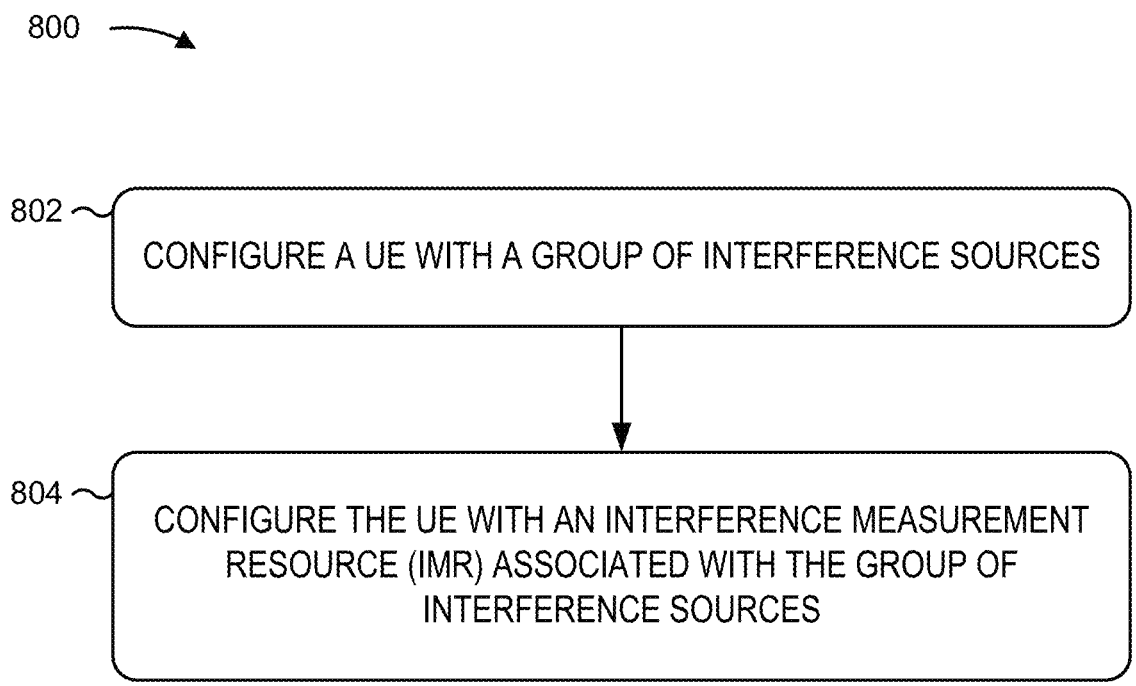
FIG. 8 is a flow diagram illustrating an example process performed, for example, by a base station, in accordance with various aspects of the present disclosure.

FIG. 8 is a flow diagram illustrating an example process 800 performed, for example, by a base station, in accordance with various aspects of the present disclosure. The example process 800 is an example of signaling for a group-based signal to interference plus noise ratio (SINR) beam report. As shown in FIG. 8, in some aspects, the process 800 may include configuring a user equipment (UE) with a group of interference sources (block 802). For example, the base station (for example, using the antenna 234a, MOD/DEMOD 232a, TX MIMO processor 230, transmit processor 220, controller processor 240, and/or memory 242) may configure the UE with the group of interference sources. The configuration may be via implicit signaling based on a resource ID, for example. The configuration may alternatively be with explicit signaling.

As shown in FIG. 8, in some aspects, the process 800 may include configuring the UE with an interference measurement resource (IMR) associated with the group of interference sources (block 804). For example, the base station (for example, using the antenna 234a, MOD/DEMOD 232a, TX MIMO processor 230, transmit processor 220, controller processor 240, and/or memory 242) may configure the UE with the IMR. The base station may implicitly signal resources or scrambling sequences for CSI-RSs for each interference source as a function of a cell ID, resource ID, or a bandwidth part associated with each interference source. In other aspects, the base station may explicitly signal resources or scrambling sequences for CSI-RSs for each interference source.

Implementation examples are described in the following numbered clauses.

1. A method of wireless communication by a user equipment (UE), comprising:
    receiving a plurality of beams from a base station; and
    simultaneously reporting a signal to interference plus noise ratio (SINR) for the plurality of beams with a single channel measurement resource (CMR) and a single interference measurement resource (IMR), the single IMR configured for a plurality of interference sources.
2. The method of clause 1, further comprising receiving the single IMR as non-zero power (NZP) channel state information reference signals (CSI-RSs) for interference measurement for the plurality of interference sources, the NZP CSI-RSs for the plurality of interference sources code division multiplexed and/or frequency division multiplexed on a same symbol.
3. The method of clause 1, further comprising:
    receiving the single IMR as non-zero power (NZP) channel state information reference signals (CSI-RSs) for interference measurement for the plurality of interference sources on a same resource element; and
    separately measuring interference from each of the plurality of interference sources based on a scrambling code for each NZP CSI-RS.
4. The method of any of the preceding clauses, further comprising reporting an indicator for each of the plurality of interference sources.
5. The method of any of the preceding clauses, in which the indicator comprises a resource ID of each of the plurality of interference sources.
6. The method of any clauses 1-4, in which the indicator comprises a bitmap indicating each of the plurality of interference sources considered for the SINR.
7. The method of any of the preceding clauses, further comprising indicating a strongest and weakest source of interference.
8. The method of any of the preceding clauses, in which the indicating comprises listing each of the plurality of interference sources, in strength order.
9. The method of any of the preceding clauses, in which the plurality of beams comprises an intended channel and the plurality of interference sources.
10. A method of wireless communication by a base station, comprising:
    configuring a user equipment (UE) with a group of interference sources; and
    configuring the UE with an interference measurement resource associated with the group of interference sources.
11. The method of clause 10, in which the configuring the UE with the group of interference sources comprises explicit signaling.
12. The method of clause 10, in which the configuring the UE with the group of interference sources comprises implicit signaling based on a resource ID.
13. The method of any of the clauses 10-12, further comprising explicitly signaling resources or scrambling sequences for channel state information reference signals (CSI-RSs) for each interference source.
14. The method of any of the clauses 10-12, further comprising implicitly signaling resources or scrambling sequences for channel state information reference signals (CSI-RSs) for each interference source as a function of a cell ID, resource ID, or a bandwidth part associated with each interference source.
15. The method of any of the clauses 10-14, further comprising signaling a size of the group explicitly.
16. The method of any of the clauses 10-14, further comprising signaling a size of the group implicitly.
17. An apparatus for wireless communications at a user equipment (UE), comprising:
    at least one processor,
    memory coupled with the at least one processor; and
    instructions stored in the memory and operable, when executed by the at least one processor, to cause the apparatus:
        to receive a plurality of beams from a base station; and
        to simultaneously report a signal to interference plus noise ratio (SINR) for the plurality of beams with a single channel measurement resource (CMR) and a single interference measurement resource (IMR), the single IMR configured for a plurality of interference sources.
18. The apparatus of clause 17, in which the at least one processor causes the apparatus to receive the single IMR as non-zero power (NZP) channel state information reference signals (CSI-RSs) for interference measurement for the plurality of interference sources, the NZP CSI-RSs for the plurality of interference sources code division multiplexed and/or frequency division multiplexed on a same symbol.
19. The apparatus of clause 17, in which the at least one processor causes the apparatus:
    to receive the single IMR as non-zero power (NZP) channel state information reference signals (CSI-RSs) for interference measurement for the plurality of interference sources on a same resource element; and
    to separately measure interference from each of the plurality of interference sources based on a scrambling code for each NZP CSI-RS.

20. The apparatus of any of the clauses 17-19q, in which the at least one processor causes the apparatus to report an indicator for each of the plurality of interference sources.

21. The apparatus of any of the clauses 17-20, in which the indicator comprises a resource ID of each of the plurality of interference sources.

22. The apparatus of any of the clauses 17-20, in which the indicator comprises a bitmap to indicate each of the plurality of interference sources considered for the SINR.

23. The apparatus of any of the clauses 17-22, in which the at least one processor causes the apparatus to indicate a strongest and weakest source of interference.

24. The apparatus of any of the clauses 17-23, in which the at least one processor causes the apparatus to indicate a listing of each of the plurality of interference sources, in strength order.

25. An apparatus for wireless communications at a base station, comprising:
at least one processor,
memory coupled with the at least one processor; and
instructions stored in the memory and operable, when executed by the at least one processor, to cause the apparatus:
to configure a user equipment (UE) with a group of interference sources; and
to configure the UE with an interference measurement resource associated with the group of interference sources.

26. The apparatus of clause 25, in which the at least one processor causes the apparatus to configure implicit signaling based on a resource ID.

27. The apparatus of clause 25, in which the at least one processor causes the apparatus to explicitly signal resources or scrambling sequences for channel state information reference signals (CSI-RSs) for each interference source.

28. The apparatus of any of the clauses 25-27, in which the at least one processor causes the apparatus to implicitly signal resources or scramble sequences for channel state information reference signals (CSI-RSs) for each interference source as a function of a cell ID, resource ID, or a bandwidth part associated with each interference source.

29. The apparatus of any of the clauses 25-28, in which the at least one processor causes the apparatus to signal a size of the group explicitly.

30. The apparatus of any of the clauses 25-28, in which the at least one processor causes the apparatus to signal a size of the group implicitly.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a user equipment (UE), comprising:
receiving at least three beams from a base station; and
simultaneously reporting a signal to interference plus noise ratio (SINR) and interference measurements for the at least three beams with a single channel measurement resource (CMR) and a single interference measurement resource (IMR), the single IMR being configured for reporting the interference measurements for a plurality of interference sources of the at least three beams.

2. The method of claim 1, further comprising receiving the single IMR as non-zero power (NZP) channel state information reference signals (CSI-RSs) for interference measurement for the plurality of interference sources, the NZP CSI-RSs for the plurality of interference sources code division multiplexed and/or frequency division multiplexed on a same symbol.

3. The method of claim 1, further comprising:
receiving the single IMR as non-zero power (NZP) channel state information reference signals (CSI-RSs) for interference measurement for the plurality of interference sources on a same resource element; and
separately measuring interference from each of the plurality of interference sources based on a scrambling code for each NZP CSI-RS.

4. The method of claim 1, further comprising reporting an indicator for each of the plurality of interference sources.

5. The method of claim 4, wherein the indicator comprises a resource ID of each of the plurality of interference sources.

6. The method of claim 4, wherein the indicator comprises a bitmap indicating each of the plurality of interference sources considered for the SINK.

7. The method of claim 4, further comprising indicating a strongest and weakest source of interference.

8. The method of claim 7, wherein the indicating comprises listing each of the plurality of interference sources, in strength order.

9. The method of claim 1, wherein the at least three beams comprises an intended channel and the plurality of interference sources.

10. An apparatus for wireless communications at a user equipment (UE), comprising:
   at least one processor,
   memory coupled with the at least one processor; and
   instructions stored in the memory and operable, when executed by the at least one processor, to cause the apparatus to:
      receive at least three beams from a base station; and
      simultaneously report a signal to interference plus noise ratio (SINR) and interference measurements for the at least three beams with a single channel measurement resource (CMR) and a single interference measurement resource (IMR), the single IMR being configured for reporting the interference measurements for a plurality of interference sources of the at least three beams.

11. The apparatus of claim 10, wherein the at least one processor causes the apparatus to receive the single IMR as non-zero power (NZP) channel state information reference signals (CSI-RSs) for interference measurement for the plurality of interference sources, the NZP CSI-RSs for the plurality of interference sources code division multiplexed and/or frequency division multiplexed on a same symbol.

12. The apparatus of claim 10, wherein the at least one processor causes the apparatus to:
   receive the single IMR as non-zero power (NZP) channel state information reference signals (CSI-RSs) for interference measurement for the plurality of interference sources on a same resource element; and
   separately measure interference from each of the plurality of interference sources based on a scrambling code for each NZP CSI-RS.

13. The apparatus of claim 10, wherein the at least one processor causes the apparatus to report an indicator for each of the plurality of interference sources.

14. The apparatus of claim 13, wherein the indicator comprises a resource ID of each of the plurality of interference sources.

15. The apparatus of claim 13, wherein the indicator comprises a bitmap to indicate each of the plurality of interference sources considered for the SINR.

16. The apparatus of claim 13, wherein the at least one processor causes the apparatus to indicate a strongest and weakest source of interference.

17. The apparatus of claim 16, wherein the at least one processor causes the apparatus to indicate a listing of each of the plurality of interference sources, in strength order.

* * * * *